United States Patent
Couleur et al.

(10) Patent No.: US 10,056,819 B1
(45) Date of Patent: Aug. 21, 2018

(54) PREDICTING THE TIMING OF CURRENT PHASES OF A DC-DC CONVERTER

(71) Applicant: Texas Instruments Incorporated, Dallas, TX (US)

(72) Inventors: Michael Couleur, Munich (DE); Neil Gibson, Freising (DE); Antonio Priego, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/792,208

(22) Filed: Oct. 24, 2017

(51) Int. Cl.
*H02M 1/00* (2006.01)
*H02M 3/04* (2006.01)

(52) U.S. Cl.
CPC ............ *H02M 1/00* (2013.01); *H02M 3/04* (2013.01); *H02M 2001/0012* (2013.01)

(58) Field of Classification Search
CPC ............... H02M 1/00; H02M 3/04; H02M 3/155–3/1588; H02M 2001/009; H02M 2001/0012
See application file for complete search history.

(56) References Cited

U.S. PATENT DOCUMENTS

| 6,353,362 B1* | 3/2002 | Corsi | H03F 3/3076 330/263 |
| 6,420,933 B1* | 7/2002 | Gibson | H03F 3/3067 330/263 |
| 9,680,378 B2* | 6/2017 | Nakamura | H02M 3/158 |
| 9,778,289 B2* | 10/2017 | Dearborn | G01R 19/0046 |
| 2004/0232901 A1* | 11/2004 | Huang | H02M 3/1588 323/282 |
| 2005/0067986 A1* | 3/2005 | Kurosawa | G11B 19/28 318/400.35 |
| 2005/0189891 A1* | 9/2005 | Kurosawa | H02P 6/28 318/400.35 |
| 2008/0088284 A1* | 4/2008 | Weng | H02M 3/1563 323/271 |
| 2008/0088292 A1* | 4/2008 | Stoichita | H02M 3/156 323/285 |
| 2010/0164570 A1* | 7/2010 | Priego | H02M 1/44 327/157 |

(Continued)

*Primary Examiner* — Yusef A Ahmed
(74) *Attorney, Agent, or Firm* — Andrew Viger; Charles A. Brill; Frank D. Cimino

(57) ABSTRACT

A timing regulation circuit includes a fixed and tunable timer. A current source generates a source current $I_1$ proportional to an inductor voltage $\Delta V_1$ of a DC-DC converter during an energizing phase and a current source generates a sink current $I_2$ proportional to inductor voltage $\Delta V_2$ during a de-energizing phase. The fixed timer controls a first switch in series with $I_1$ or $I_2$ and the tunable timer controls a balancing switch in series with the other current. $I_1$ or $I_2$ is coupled by the first switch and the other current is coupled by the balancing switch to a common capacitor that provides a regulation voltage to the tunable timer which outputs a regulated duration (Tregulated) for an energizing or de-energizing phase. When Tregulated closes the balancing switch the common capacitor provides a predicted current returning inductor current to a starting value when all phases finish for providing a volt-second balance.

17 Claims, 7 Drawing Sheets

(56) References Cited

U.S. PATENT DOCUMENTS

| | | | |
|---|---|---|---|
| 2011/0001462 A1* | 1/2011 | Couleur | H02M 3/155 323/289 |
| 2011/0121806 A1* | 5/2011 | Garrett | H02M 3/156 323/282 |
| 2012/0161738 A1* | 6/2012 | Nakashima | H02M 3/158 323/284 |
| 2013/0063102 A1* | 3/2013 | Chen | H02M 3/156 323/234 |
| 2014/0070785 A1* | 3/2014 | Galloway | H02M 3/1582 323/285 |
| 2014/0111179 A1* | 4/2014 | Couleur | H02M 3/1584 323/312 |
| 2014/0197812 A1* | 7/2014 | Lee | H02M 1/143 323/282 |
| 2015/0280557 A1* | 10/2015 | Xue | H02M 3/156 323/271 |
| 2016/0109488 A1* | 4/2016 | Dearborn | H02M 3/156 324/76.11 |
| 2016/0164506 A1* | 6/2016 | Almazon | H03K 3/0231 327/182 |
| 2017/0201178 A1* | 7/2017 | Cheng | H02M 3/1582 |
| 2017/0257086 A1* | 9/2017 | Almazan | H03K 3/0231 |
| 2018/0024171 A1* | 1/2018 | Dearborn | H02M 3/156 |

\* cited by examiner

PREDICTING THE TIMING OF CURRENT PHASES OF A DC-DC CONVERTER

FIELD

This Disclosure relates to the detection of inductor current reversal in switching converters.

BACKGROUND

Power converters for medium and high voltage applications are commonly used for converting a first current at a first frequency and a first voltage into a second current at a second frequency and a second voltage. Many types of different power converters are known, such as for converting AC to AC, AC to DC, DC to AC and DC to DC.

A switching regulator is a circuit that includes a controller and a power converter including at least one power phase (or stage) that can comprise a power switch, an inductor, and a diode, a high-side power transistor and a low-side power transistor, or 4 power switches with the inductor between the respective pairs of switches for a Buck-boost converter. The power stage is connected in series between supply terminals with a converter switching node at the interconnection of the power transistors adapted for connection to the inductor to transfer energy from the input to the output, where the power switch(es) converts the input voltage to the desired output. The controller and power phase(s) are linked by a feedback loop, and the controller supervises the switching operation of the power phase(s) to regulate the output voltage.

The basic components of the power phase(s) can be rearranged to form a switching converter such as for example as a buck, boost, or buck-boost converter to regulate the energy transfer and maintain a constant output voltage within normal operating conditions. In the simplest case of a single energizing and de-energizing phase it can be established that for a given inductor charging time, $t_{ON}$, and a given input voltage and with the converter circuit in equilibrium, there is a specific inductor discharge time, $t_{OFF}$, for a given output voltage.

When designing a switching DC-DC regulator system to predict the length of the different operating phases (being at least one charging time and at least one discharging time) during each switching cycle constituting the pulse-width modulation (PWM) or PFM regulation. This allows for example one to design a PFM inductor current pulse comprising an energizing pulse where the inductor current increases and a de-energizing pulse where the inductor current decays (decreases) back to zero.

The energizing and de-energizing pulses should relate to each other according to the volt-second balance principle so that the end of the de-energizing pulse (associated with rampdown in inductor current) happens when the inductor current returns to the same current value so that steady-state operation is reached.

Regarding the meaning of volt-second balance, the voltage (V) across an inductor of a power phase of a power converter is V=L*di/dt, where L is the inductance of the inductor and i is the inductor current, and t is time, so that L*di=V*dt. The change in inductor current di is thus proportional to the product of the inductor voltage V and dt. As long as a constant polarity of voltage across the inductor is applied over a continuous period of time, di is non-zero, and hence the current across the inductor keeps ramping in magnitude one direction. In the simplest case of a single energizing and de-energizing phase, for the inductor current to reach steady-state operation over time, if the current ramps up by di over time $t_1$, it must ramp down by di over time $t_2$. Only then would the inductor current have returned to its initial state after a time of $t_1+t_2$.

When a switching regulator designer is not able to predict the inductor current rampup (during the energizing operating phase) and inductor current rampdown (during the de-energizing operating phase) times accurately during the switching cycles, conventionally the designer needs to rely on current comparators which are used for checking the reversal of the inductor current and the controller's stopping of the de-energizing phase. These current comparators are difficult to design because they need to be fast in the control mode (e.g., PFM mode) where the quiescent current is low. The propagation delay of the current comparators also results in a timing error added on top of their DC offset error.

SUMMARY

This Summary briefly indicates the nature and substance of this Disclosure. It is submitted with the understanding that it will not be used to interpret or limit the scope or meaning of the claims.

This Disclosure includes a new way to predict inductor current reversal without the conventional need for high speed comparators. This is achieved by predicting the time duration of the different operating phases (at least one energizing and at least one de-energizing phase) that constitute each cycle of the inductor current. The length of all operating phases except one are fixed, and the duration of the last phase is regulated (thus is not fixed) in order for the inductor current to return to its starting value when all phases are finished.

This Disclosure also includes a timing regulation circuit that translates the volt-second balance principle equation from the voltage domain into the current domain by replacing the differential inductor voltage by a proportional current and the inductor of the converter by a capacitor referred to herein as a 'common capacitor'. This Disclosure for example can be applied to PFM controllers.

A method of timing regulation for power converter control is disclosed. Voltages are obtained (which can be sensed or can be estimated) across an inductor of at least one power phase of a DC-DC converter during a switching cycle including during a plurality of operating converter phases comprising a first voltage $\Delta V_1$ during an energizing phase and a second voltage $\Delta V_2$ during a de-energizing phase. A source current ($I_1$) proportional to $\Delta V_1$ and a sink current ($I_2$) proportional to $\Delta V_2$ are generated. A timing regulation circuit is utilized that is coupled to receive $I_1$ and $I_2$, where $I_1$ and $I_2$ are coupled to a common capacitor by switches controlled by at least one fixed duration timer and one tunable timer that are each coupled to receive clock signals for triggering.

The common capacitor provides a regulation voltage (VCTRL) that is coupled to a control node of the tunable timer, and the tunable timer outputs a regulated duration (Tregulated) for the selected operating phase. Tregulated is used for controlling a volt-second balancing switch that is coupled to the common capacitor so that when the balancing switch is closed a predicted current (Ipredict) is provided that returns the inductor current to a starting value when all operating converter phases are finished for providing a volt-second balanced condition around the inductor. The operation of the DC-DC converter is controlled using the fixed durations and Tregulated.

BRIEF DESCRIPTION OF THE DRAWINGS

Reference will now be made to the accompanying drawings, which are not necessarily drawn to scale, wherein.

DETAILED DESCRIPTION

Figure 1:
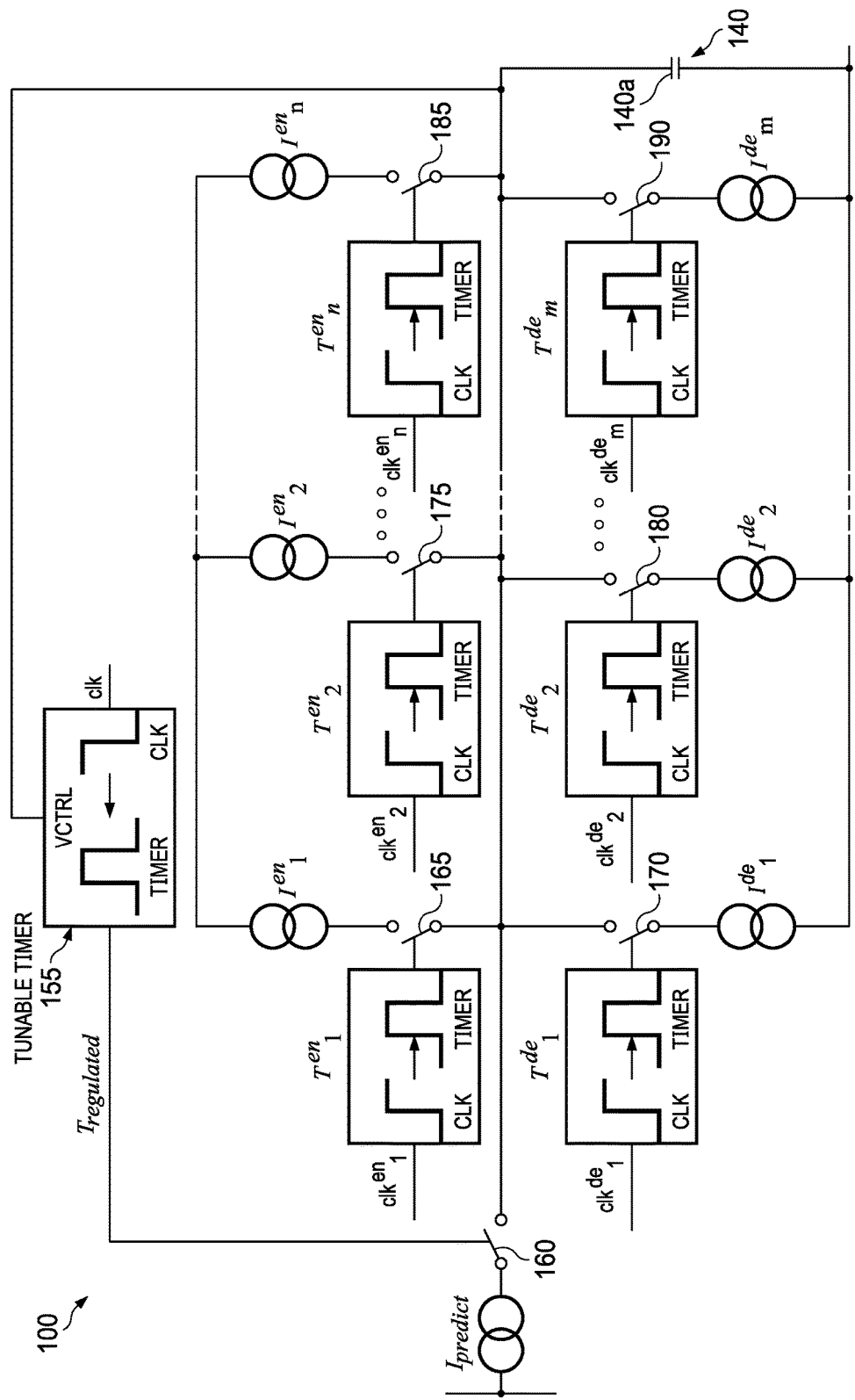
FIG. 1 shows an example timing regulation circuit for achieving a volt-second balance for the inductor of a power phase of a DC-DC converter, according to this Disclosure.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this Disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Every switching cycle of a DC-DC converter is recognized to include at least 1 energizing phase and 1 de-energizing phase at a minimum to be able to fulfill the volt-second balance principle. A buck converter for example will have 2 operating phases being an on-phase or energizing phase (having a positive inductor current slope) and an off phase or de-energizing phase (having a negative inductor current slope), and a buck-boost converter may have 3 or 4 operating phases.

During each energizing phase the inductor current is increased the inductor sees a differential voltage across its terminals, where the voltage across the inductor V is given by V=Ldi/dt. During each de-energizing phase where the inductor current is decreased the inductor similarly sees a differential voltage across its terminals. As described above, disclosed timing regulation circuits translate the volt-second balance principle equation from the voltage domain to the current domain, where 'en' as used herein is short for energizing, and 'de' as used herein is short for de-energizing. T is the period, and V the inductor voltage in the known volt-second balance principle equation in the voltage domain (with the current in the inductor regulated to a constant average DC value) shown below as equation (1), where the timing regulation circuit includes a set of timers and a common capacitor:

$$\sum_{n=1}^{N}\Delta V_n^{en}*T_n^{en} = \sum_{m=1}^{M}\Delta V_m^{de}*T_m^{de} \quad (1)$$

By replacing the differential inductor voltages and $\Delta V_n^{en}$ and $\Delta V_m^{de}$ in equation (1) by a proportional current in equation (2) below that is proportional to each of $\Delta V_n^{en}$ and $\Delta V_m^{de}$, $$I_n^{en} = \alpha * \Delta V_n^{en} \text{ and } I_m^{de} = \alpha * \Delta V_m^{de} \quad (2)$$

and by substituting equation (2) into equation (1), the volt-second balance principle equation in the voltage domain is translated into a volt-second balance principle equation in the current domain as shown in equation (3) below:

$$\sum_{n=1}^{N}I_n^{en}*T_n^{en} = \sum_{m=1}^{M}I_m^{de}*T_m^{de} \quad (3)$$

Equation (3) as described above is implemented by replacing the inductor by a capacitor. Disclosed timing circuit sub-blocks for a PFM controller decide when the switching cycle ends which thus avoids the need for conventional inductor current comparators when one is not able to accurately predict the current rampup and current rampdown times. The PFM controller includes another sub-block to initiate the cycle that generally comprises a comparator (that need not be high speed comparator) which monitors Vout of the converter and initiates a new switching phase whenever Vout drops below a target value.

As described above, during each switching cycle there is at least 1 inductor current rampup/energizing phase and at least 1 current rampdown/de-energizing phase for the inductor of the power phase(s) of a DC-DC converter that needs to be controlled to follow the volt-second balanced condition to reach steady-state operation. Although disclosed examples can be applied to multi-phase DC-DC converters, for simplicity a single phase DC-DC converter thus having a single inductor is generally described herein.

Disclosed implementations do not interfere with the continuous conduction mode (CCM) operating mode and are compatible with the automatic detection of power save modes (e.g., PFM), and the automatic detection of any other mode where current reversal is not allowed. For example, in discontinuous conduction mode (DCM) no current reversal is allowed but in contrast to PFM the system switches at a fixed switching frequency. Disclosed implementations can be used for a PFM only system, PWM with automatic PFM detection system, or a PWM with automatic DCM detection system.

FIG. 1 shows an example timing regulation circuit 100 for achieving a volt-second balance for the inductor current during switching operation of a power phase of a DC-DC converter, according to this Disclosure. To make this description generic, the operating phases of the DC-DC converter during its switching cycles in FIG. 1 are shown as N increasing inductor current operating phases shown as energizing currents $I^{en}_1, I^{en}_2 \ldots I^{en}_n$ and M decreasing inductor current operating phases shown as $I^{de}_1, I^{de}_2, \ldots I^{de}_n$. Practically, the DC-DC converter will generally have a total of 2 operating phases (1 energizing phase and 1 de-energizing phase) during switching cycles for buck and boost converters, and can comprise 3 or 4 operating phases during switching cycles for a buck/boost converter.

As described above, timing regulation circuit 100 translates the volt-second balance principle equation (1) from the voltage domain to the current domain equation (3) by replacing the differential inductor voltages ΔVs by proportional en currents $I^{en}_1$, $I^{en}_2$ . . . $I^{en}n$ and proportional de currents $I^{de}_1$, $I^{de}_2$, . . . $I^{de}n$ using (2) and by replacing the inductor by a common capacitor 140. As described above the deciding when the switching cycle ends performed by disclosed timing circuit sub-blocks of a PFM controller can operate under current mode control (CMC) or voltage mode control (VMC).

The timing regulation circuit 100 operates by regulating (or controlling) the timing of one of the operating phases of the DC-DC converter circuit shown by including a tunable timer 155 for generating a time period shown as Tregulated that is needed for providing a volt-second balance around the inductor of the converter for the general converter case of N+M converter operating phases. A time duration T for each of the other plurality of operating converter phases is each fixed by the fixed timers $T^{en}_1$, $T^{en}_2$, . . . $T^{en}_n$ and $T^{de}_1$, $T^{de}_2$, . . . $T^{de}_m$ during each of the switching cycles.

Tregulated is coupled to control a volt-second balancing switch (balancing switch) 160 that is between a common capacitor 140 and the current source shown as Ipredicted. The common capacitor 140 has a typical capacitance value range that depends on α, the gain-bandwidth product (GBW) and the circuit technology used, but a range of a few pF to tens of pF is generally considered to be a good compromise in most cases.

Each of fixed timers $T^{en}_1$, $T^{en}_2$, . . . $T^{en}_n$ and $T^{de}_1$, $T^{de}_2$, . . . $T^{de}_m$ is also coupled to control a respective switch that is in series with a current source or a current sink. Specifically, as shown in FIG. 1, $T^{en}_1$ is coupled to control switch 165 that is in series with a current source $Ien_1$, $T^{en}_2$ is coupled to control switch 170 that is in series with a current sink $I^{de}_1$, $T^{en}_2$ is coupled to control switch 175 that is in series with a current source $I^{en}_2$, $T^{de}_2$ is coupled to control switch 180 that is in series with a current sink $I^{de}_2$, $T^{en}_n$ is coupled to control switch 185 that is in series with a current source $I^{en}_n$, and $T^{de}_m$ is coupled to control switch 190 that is in series with a current sink $I^{de}m$.

Switches shown herein such as the balancing switch 160 and the other switches 165, 170, etc. can comprise metal-oxide-semiconductor field-effect transistor (MOSFET) switches, or any other suitable switch type. To generate Tregulated, first internal source currents In are generated shown as $I^{en}_1$, $I^{en}_2$ and $I^{en}_n$ that are proportional to the $\Delta V^{en}_n$ that is a voltage value sensed or estimated across the inductor and internal sink currents $I_m$ are generated shown as $I^{de}_1$, $I^{de}_2$ and $I^{de}n$ are generated that are proportional to $\Delta V^{de}_m$ value also sensed or estimated across the inductor, where a is the proportionality constant used in equation (2) above. Although $\Delta V^{en}_n$ is most accurately sensed across the inductor, sometimes simply the converter voltages Vin and Vout can be used to estimate the inductor voltage. Vin/Vout is generally a good approximation that is generally sufficient for most of the cases that can simplify the circuit design. Vin/Vout is what is used for the voltage across the inductor in the FIGs. described below for the buck, boost and buck-boost converter cases.

The α in equation (2) which defines the GBW of the timing regulation circuit is a function of the capacitance of the common capacitor 140. The GBW=α/2πC, where C is the capacitance of common capacitor 140. Because the timing regulation circuit is a single pole regulator system, the only limitation on the GBW is the switching frequency. The bandwidth should generally be sufficiently less than the Nyquist rate which as known in the art is the minimum rate at which a signal can be sampled without introducing errors, which is twice the highest frequency present in the signal.

The tunable timer 155 can comprise a variable monostable multivibrator, such as the variable monostable multivibrator 600 for handling the de-energizing phase timing shown in FIG. 6 described below. As known in the art, a monostable multivibrator is an electronic circuit that generates an output pulse that when triggered of a pre-defined duration. The monostable multivibrator circuit then after the pre-defined duration elapses returns to its quiescent state and produces no more output pulses until it is triggered again.

Alternatives to variable monostable multivibrator for the tunable timer 155 include using a small value timing capacitor and a much larger value resistor up to about 20 MΩs to produce the desired time delay value. Also by using one smaller value timing capacitor and different resistor values connected to it through a multi-position rotary switch, one can produce a monostable timer oscillator circuit which can produce different pulse widths at each switch rotation. There are many other methods or circuits for producing a monostable multivibrator known to those having ordinary skill in the art that may be used. The respective timers in the timing circuit are coupled to receive clock signals shown as clk, along with clk variants that may all be provided by a state machine (see the state machine 715 in FIG. 7 described below).

The top plate 140a of the common capacitor 140 is used as a regulation voltage that is coupled to a control node of the tunable timer 155 configured for receiving a voltage control (VCTRL) signal input. In response, the tunable timer 155 outputs Tregulated for the selected phase configured for the inductor to achieve a volt-second balance.

The VCTRL signal operates so that that if the regulated phase is a de-energizing phase that is too short, VCTRL will rise. To compensate for this the timing regulation circuit needs to extend the pulse duration of the regulated phase and a tunable timer 155 such as the variable monostable vibrator 600 shown in FIG. 6 for the de-energizing phase can fulfill the need that the pulse duration is extended with VCTRL. In FIG. 6 the VREF of the circuit is the control signal VCTRL in FIG. 1. A small modification to the variable monostable vibrator 600 shown in FIG. 6 enables disclosed timing control when the regulated phase is an energizing phase so that when that phase is too short, VCTRL will drop. The timing regulation circuit needs again to extend the pulse duration of the regulated phase but now for the energizing phase the polarity of the VCTRL signal has changed.

An increase to the time duration of the tunable timer 155 can be accomplished by raising the threshold voltage of the variable monostable multivibrator. The time duration of the tunable timer 155 can be decreased by using a voltage-to-current (V-to-I) conversion of the VCTRL signal to generate a current, and using the resulting current to charge the monostable multivibrator's timing capacitor shown as Ct 615 in FIG. 6 described below. In that way, keeping the comparator threshold fixed, an increase in VCTRL will cause the time duration of the pulse shown in equation 4 below as 'TIMER' to fall (decrease).

$$\text{TIMER} = C_T \times V/I \qquad \text{equation (4)}$$

I=ICTRL which can be defined by an external current source, and V is regulated and equal to VCTRL. Then from equation (4), when VCTRL rises, the time duration of the TIMER increases. In this arrangement V of TIMER is constant=VCTRL and I are both regulated and equal to $I_{CTRL}=V_{CTRL}/R(V\text{-to-}I)$. Thus when $V_{CTRL}$ rises, $I_{CTRL}$ rises as well according to Equation 4, which leads to a time duration reduction of the TIMER output. This version of the monostable multivibrator is where the pulse width is controlled via $I_{CTRL}$. A simple known V-to-I converter circuit can be used to convert the $V_{CTRL}$ signal into the $I_{CTRL}$ signal for the monostable multivibrator.

The clock signals shown initiate (trigger) the timers (fixed timers $T^{en}_1, T^{en}_2, \ldots T^{en}_n$ and $T^{de}_1, T^{de}_2, \ldots T^{de}_m$ and the tunable timer 155) and variants thereof are generally different, and are thus shown as $clk^{en}1, clk^{en}2, \ldots clk^{en}n$ for energizing phases $1, 2, \ldots n$ and $clk^{de}_1, clk^{de}_2, \ldots clk^{de}m$ for the de-energizing phases $1, 2, \ldots m$, and clk for clocking the tunable timer 155. These respective clk signals come generally from a state machine as described above, where the current operating phase of the DC-DC converter is decided.

The fixed timers $T^{en}_1, T^{en}_2, \ldots T^{en}_n$ and $T^{de}_1, T^{de}_2, \ldots T^{de}_m$ provide fixed time durations that are generally fixed for a given operating condition comprising a given input voltage $V_{in}$, output voltage $V_{out}$ and in some cases for a given input current and/or output current. These fixed timers use at least the DC-DC converter's Vin/Vout as inputs used for predicting the corresponding time duration for its operating phase in order to achieve for example a certain switching frequency in PWM. Other criteria can also be used to achieve a certain inductor current ripple which is related to the switching frequency so that disclosed fixed timers can be considered to be predictive timers.

For example, in the buck converter case shown in FIG. 2 described below, an embodiment can be $T_{on}=V_{out}/V_{in}\times$ constant, where the constant is a targeted PWM constant switching frequency. If Vin/Vout changes, Ton provided by the timer 230 will adapt to the new operating condition in order to ensure a constant PWM frequency.

The tunable timer 155 shown in FIG. 1 is being regulated to ensure that the sourcing charges $$\sum_{n=1}^{N} I_n^{en} * T_n^{en}$$

are equal to the sinking charges $$\sum_{m=1}^{M} I_m^{de} * T_m^{de}.$$

That is why the timer coupled to the balancing switch 160 is referred to herein as a tunable timer 155 and its time duration output is referred to herein as $T_{regulated}$.

During operation of the timing regulation circuit 100 in FIG. 1 in each switching cycle, the common capacitor 140 is:

1. charged by the energizing currents $I_n^{en}$ for the same duration $T_n^{en}$ that the corresponding energizing voltage $\Delta V_n^{en}$ is applied across the inductor in the DC-DC converter, and is 2. discharged by the de-energizing currents $I_m^{de}$ for the same duration $T_m^{de}$ the corresponding de-energizing voltage $\Delta V_m^{de}$ is applied across the inductor in the DC-DC converter.

The Tregulated pulse output of the tunable timer 155 turns on the balancing switch 160 to provide the current source shown as Ipredict which will charge or discharge the common capacitor 140 according to the polarity of the corresponding ($\Delta V_{predicted}$) for the duration of the Tregulated pulse. I predict is generated in the same way as described above for Ien and Ide, i.e. it is proportional to the inductor voltage during that operating phase. The only difference is that Ipredict can be an energizing current or de-energizing depending on the operating phase being regulated. The timing regulation circuit 100 thus achieves stability when the voltage on the common capacitor 140 is stable, which is achieved when the sourcing currents and sinking currents are equal. This sourcing and sinking current's being equal translates into equation (3) shown above, which is copied again below.

$$\sum_{n=1}^{N} I_n^{en} * T_n^{en} = \sum_{m=1}^{M} I_m^{de} * T_m^{de}. \quad (3)$$

Since from equation (2) above ($I_n^{en}=\alpha*\Delta V_n^{en}$ and $I_m^{de}=\alpha*\Delta V_m^{de}$) a disclosed timing regulation circuit such as the timing regulation circuit 100 shown in FIG. 1 will thus satisfy the volt-second balance principle across the inductor. One can then ensure that the switching converter system reaches equilibrium when the volt-second balance equation (1) around the inductor is satisfied meaning when Tregulated is equal to the time the inductor current was missing in order to return to its initial value. Disclosed regulated systems will thus satisfy the volt-second principle around the inductor.

Figure 2:
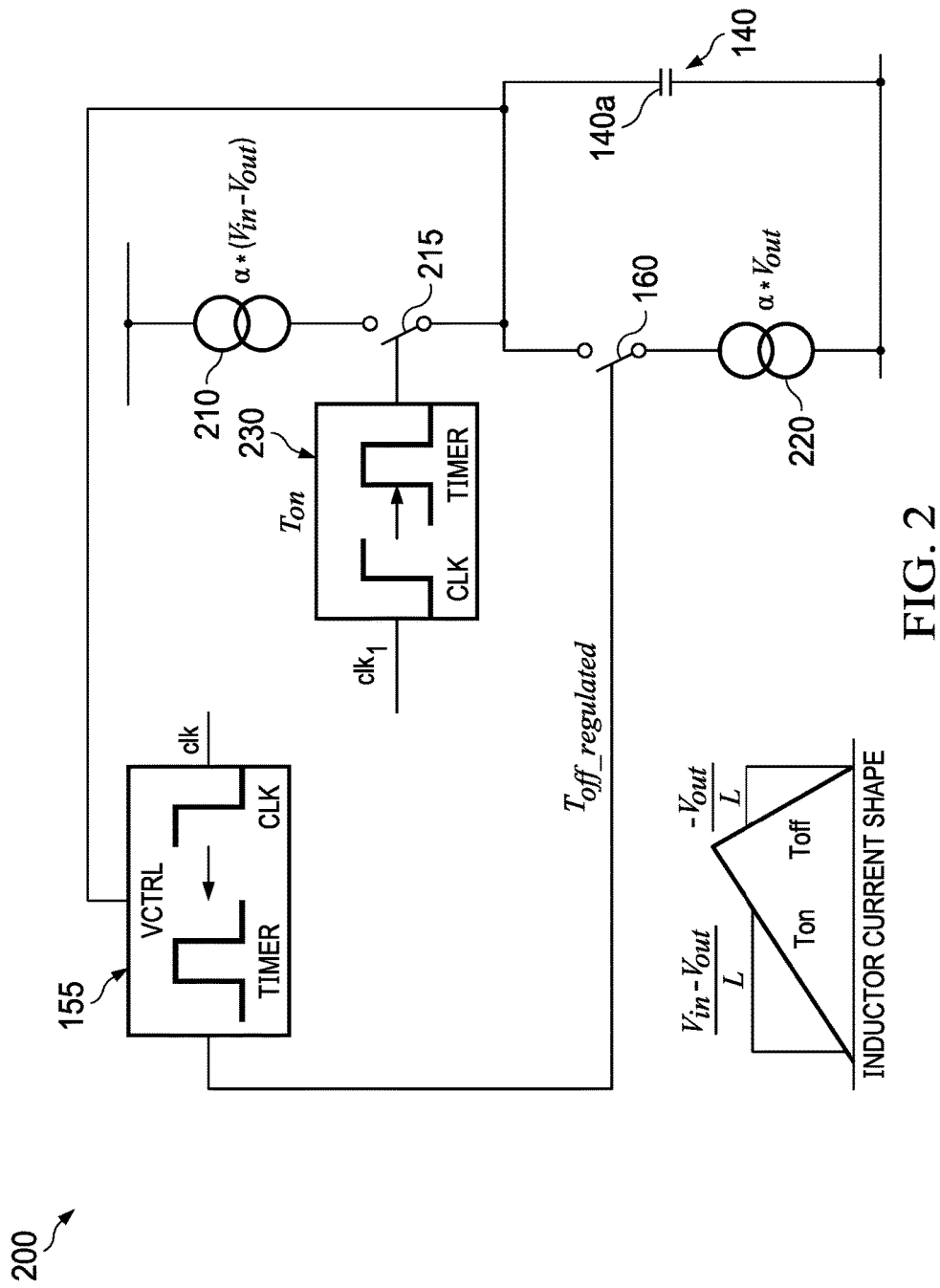
FIG. 2 shows example phase timing control of a buck converter to provide a volt-second balanced operation, according to this Disclosure.

FIG. 2 shows application of a disclosed timing regulation circuit 200 to the buck converter case. An example of the inductor current shape for the buck converter is also shown having 1 energizing and 1 de-energizing operating phase. A tunable timer 155 for the operating phase to be regulated and a fixed timer 230 for the other of the operating phases are shown. A charge pump with a source current 210 from a current source associated with the fixed timer 230 that controls switch 215 and a sink current 220 from a current sink associated with the tunable timer 155 that controls the balancing switch 160 as shown may be used. The source current 210 level is proportional to the buck converter's input voltage Vin−Vout. The sink current 220 level is proportional to Vout. The clock shown as $clk_1$ applied to the fixed timer 230 triggers the pulse, where the duration of this pulse is determined by the fixed timer 230 itself that is Ton in this example, which is thus known. By knowing Ton the timing regulation circuit 200 thus can accurately determine and thus set the length (duration) of the other operating phase shown as Toff_regulated of the duty cycle to satisfy the volt-second principle around the inductor of the buck converter.

Figure 3:
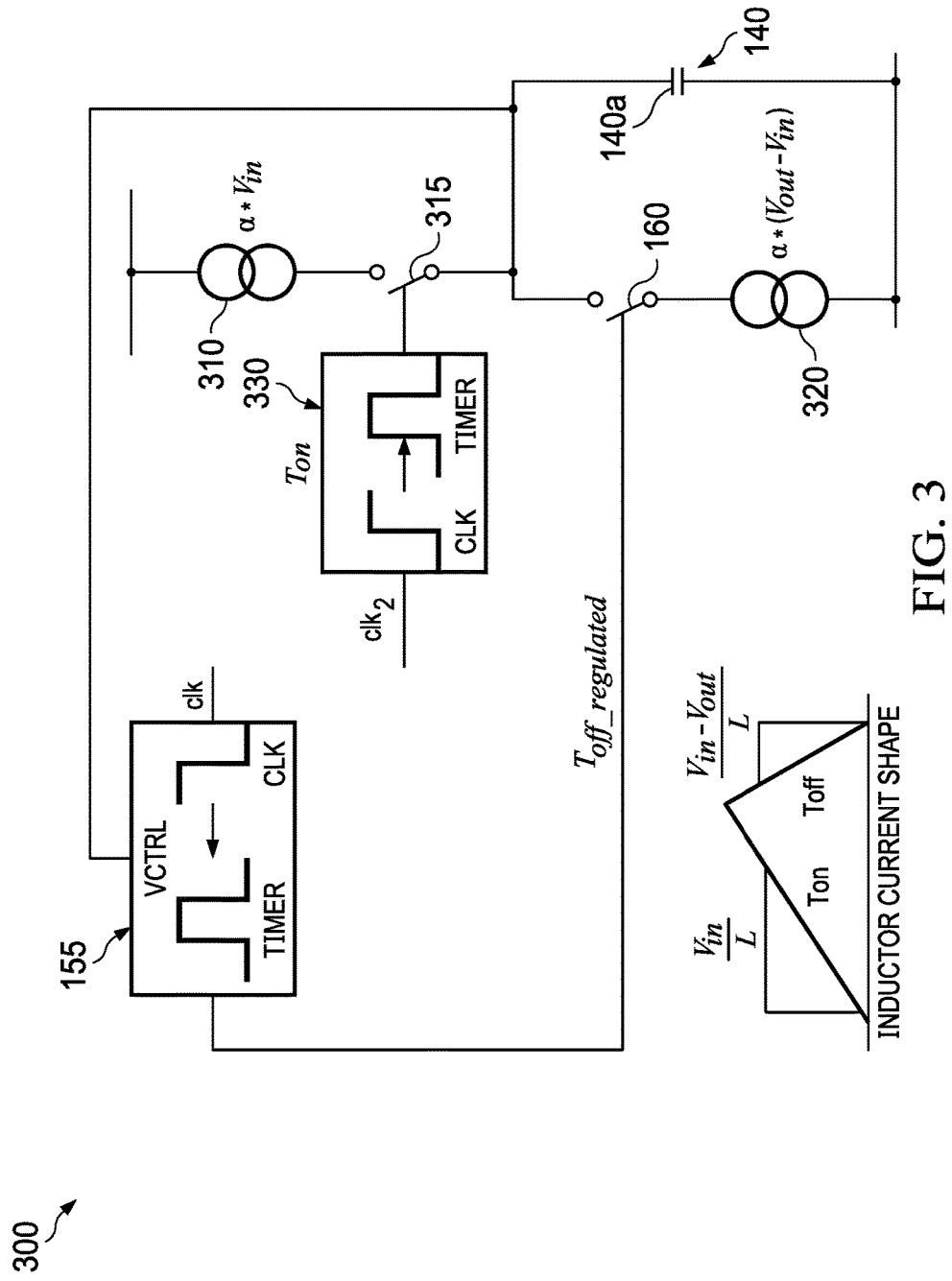
FIG. 3 shows example phase timing control of a boost converter to provide a volt-second balanced operation, according to this Disclosure.

FIG. 3 shows application of a disclosed timing regulation circuit 300 to the boost converter case. An example of the inductor current shape for the boost converter is also shown having 1 energizing and 1 de-energizing operating phase. A tunable timer 155 for the operating phase to be regulated coupled to control a balancing switch 160 and a fixed timer 330 coupled to control a switch 315 for the known operating phase are shown. A charge pump with a source current 310 associated with the fixed timer 330 and a sink current 320 associated with the tunable timer 155 are used as with the buck converter case shown in FIG. 2. The source current 310 is proportional to Vin. The sink current 320 is proportional to Vout−Vin. By knowing $T_{on}$ output by the fixed timer 330 as shown, the timing regulation circuit 300 can accurately determine and thus set the length of the other operating phase (shown as Toff_regulated) of the duty cycle to satisfy the volt-second principle around the inductor of the boost converter.

Figure 4:
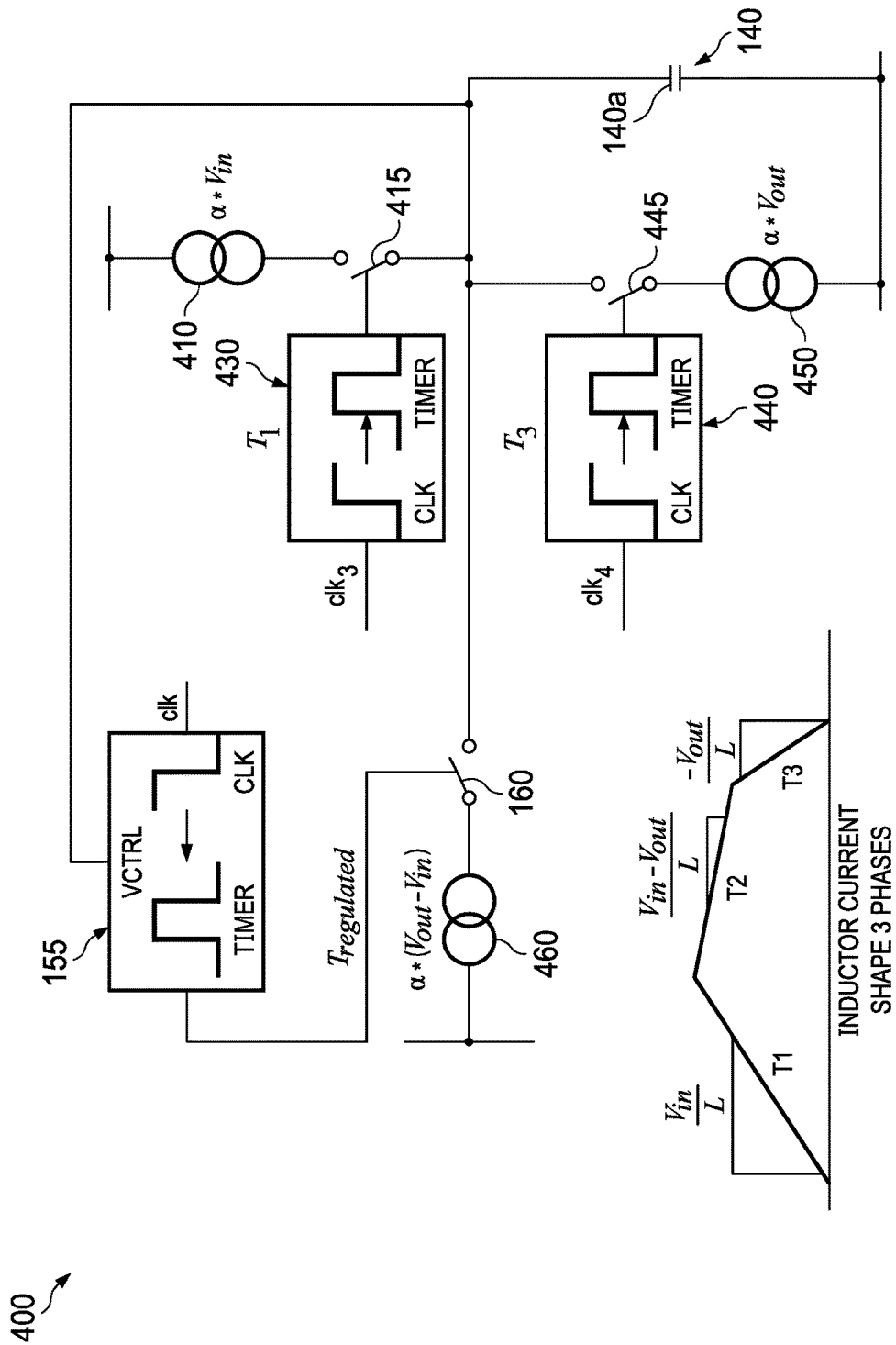
FIG. 4 shows example phase timing control of a 3 operating phase buck-boost converter to provide a volt-second balanced operation, according to this Disclosure.

FIG. 4 shows application of disclosed timing regulation circuit 400 to the 3 operating phase non-inverting buck-boost converter case. An example of the inductor current shape for the non-inverting buck-boost converter is also shown having 1 energizing and 2 de-energizing operating phases. As known in the art of power converters, a 3 phase buck-boost converter is a converter made out of 4 power switches hooked up in an H-bridge configuration with the inductor in the center. The half-bridge on the Vin side is called the buck side and the half-bridge on the Vout side is called the boost side. The inductor current flows as follows in each duty cycle as a:

1$^{st}$ operating phase, where the high side switch of the buck side and low side switch of the boost side are ON so that the inductor current increases, a 2$^{nd}$ operating phase, where both high side switches are On so that the inductor current might decrease or increase depending on the relationship between Vin and Vout, and a 3$^{rd}$ operating phase where he low side switch of buck side and high side switch of boost side are On so that the inductor current decreases back to the initial inductor current value.

If one fixes 2 of the 3 operating phase timings of the above operating phase sequence the timing regulation circuit 400 can accurately determine the timing of the third operating phase using a disclosed timing regulation circuit cycle to satisfy the volt-second principle around the inductor. In this case the timing regulation circuit 400 comprises a charge pump with 3 branches each with a current source for each of the operating phases. A tunable timer 155 is shown coupled to control a balancing switch 160 for the operating phase to be regulated, and fixed timer 430 is coupled to control a switch 415 and another fixed timer 440 is coupled to control a switch 445 for the known operating phases. One current source 410 is associated with the fixed timer 430 that is proportional to Vin. One bidirectional current source 460 is associated with the tunable timer 155 that is proportional to Vin−Vout. One current sink 450 is associated with fixed timer 440 that is proportional to Vout. As shown in FIG. 4 by knowing two of the three operating phase times shown as $T_1$ output by fixed timer 430 and $T_3$ output by fixed timer 440, shown triggered by clk$_3$ and clk$_4$, respectively, the timing regulation circuit 400 can accurately determine and thus set the length of the other operating phase (shown as Toff_regulated) of the duty cycle to satisfy the volt-second principle around the inductor for the non-inverting buck-boost converter case.

Figure 5:
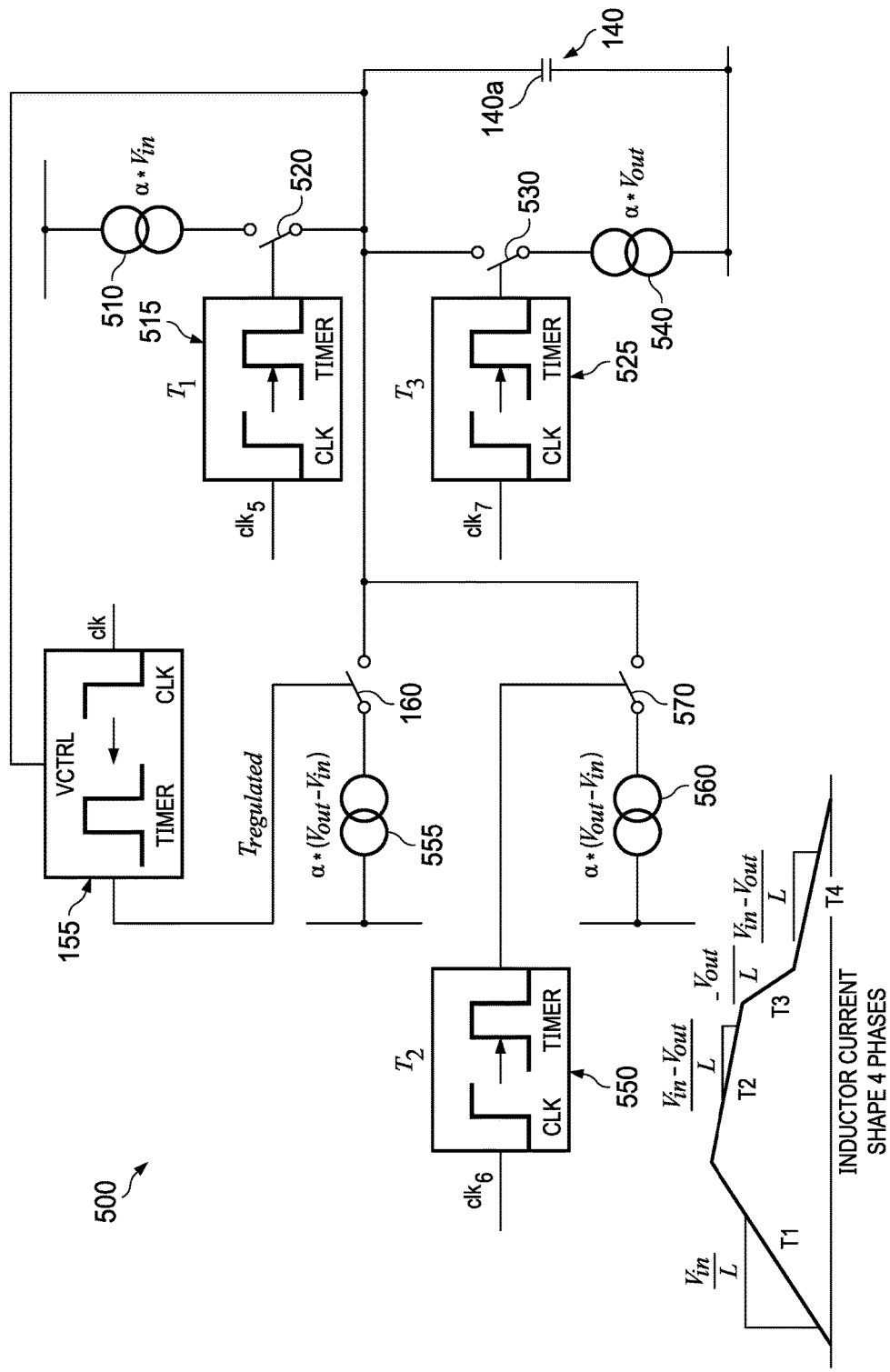
FIG. 5 shows example phase timing control of a 4 operating phase buck-boost converter to provide a volt-second balanced operation, according to this Disclosure.

FIG. 5 shows application of disclosed timing regulation circuit 500 to the 4 operating phase buck-boost converter case. An example of the inductor current shape for the 4 phase buck-boost converter is also shown having 1 energizing and 3 de-energizing operating phases. A so called 4 phase buck-boost converter as known in the art of power converters is a converter made out of 4 switches in an H-bridge configuration. The half-bridge on the Vin side is called the buck side and the half-bridge on the Vout side is called the boost side. The inductor current flows in each duty cycle as:

a 1$^{st}$ operating phase, where the high side switch of the buck side and low side switch of the boost side are ON=>the current increases;

a 2$^{nd}$ operating phase, where both high side switches are On=>the current might decrease or increase depending on the relationship between Vin and Vout;

a 3rd operating phase, where the low side switch of buck side and high side switch of boost side are On=>the current decreases back to initial value, and a 4$^{th}$ operating phase, being the same as the second operating phase, where both of the high side switches are On=>the current might decrease or increase depending on the relationship between Vin and Vout.

In this case the timing regulation circuit 500 will comprise a charge pump with 3 branches. A tunable timer 155 shown coupled to control a balancing switch 160 for the operating phase to be regulated, and fixed timers for the known operating phases comprising fixed timer 515 shown coupled to control a switch 520, fixed timer 525 shown coupled to control a switch 530, and fixed timer 550 shown coupled to control a switch 570. One current source 510 is associated with fixed timer 515 that provides a current that is proportional to Vin, there are two bidirectional current sources, bidirectional current source 555 associated with tunable timer 155 and bidirectional current source 560 associated with fixed timer 550 that that both provide currents proportional to Vin−Vout, and one sink current sink 540 associated with fixed timer 525 that provides a current that is proportional to Vout.

During operation, the bidirectional branches will be turned ON during phase 2 and phase 4. If one fixes 3 of the 4 operating phase timings of the above operating phase sequence shown by fixing $T_1$ output by fixed timer 515, $T_2$ output by fixed timer 550 and $T_3$ output by fixed timer 525 triggered by clk$_5$, clk$_6$ and clk$_7$ respectively, the timing regulation circuit 500 can accurately determine and thus set the length of the other operating phase (shown as generating Toff_regulated) of the duty cycle to satisfy the volt-second principle around the inductor for the 4 phase buck-boost converter case.

The design of the tunable timer 155 used to generate Tregulated, such as a variable monostable (or one-shot) multivibrator, can be coarse because its errors in operation will essentially be regulated out by the control loop. A course tunable timer design with low quiescent current is generally sufficient to achieve an appropriate Tregulated value to satisfy the volt-second principle around the inductor. As known in the art, a monostable multivibrator has only one stable state and produce a single output pulse for a specific time period when it is triggered externally. Monostable multivibrators only return back to their first original and stable state after a period of time determined by the time constant of the RC coupled circuit.

Figure 6:
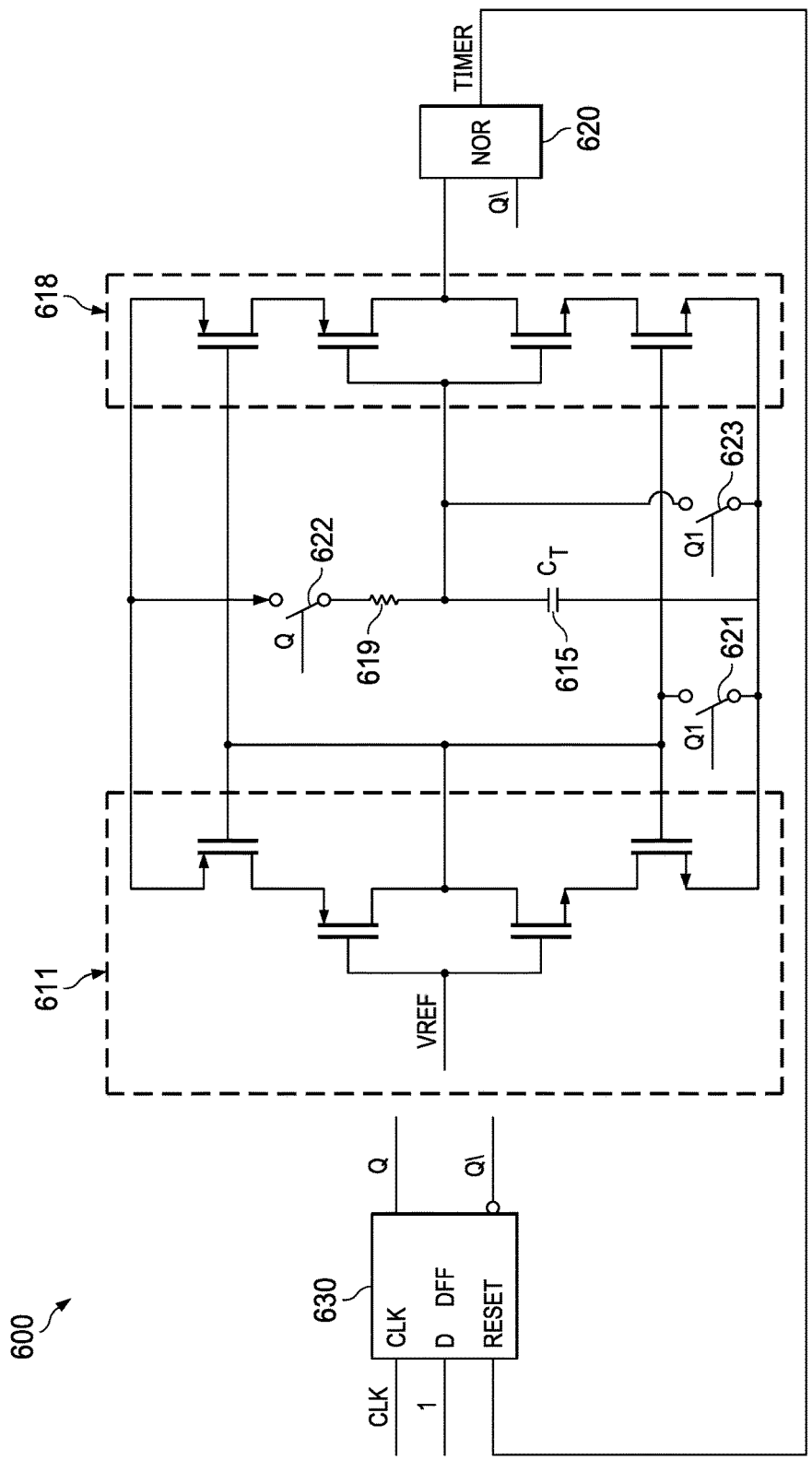
FIG. 6 is an example of a specific implementation of a tunable timer comprising a variable monostable multivibrator for controlling a de-energizing phase.

An example of a specific implementation of a relatively simple tunable timer comprising a variable monostable multivibrator 600 for controlling a de-energizing phase is provided in FIG. 6. As described above, the VREF for this circuit is the control signal VCTRL shown in FIG. 1 and the current to charge the capacitor $C_T$ 615 is fixed, being defined by a voltage and a resistor shown as resistor 619 in this example.

The variable monostable multivibrator 600 includes an input stage 611 comprising several MOS transistors for receiving the VREF signal (VREF=VCTRL in FIG. 1 coupled to tunable timer 155) as an external input signal, and an output stage 618 comprising several MOS transistors. There is cross coupling between MOS transistors in the input stage 611 and the output stage 618, along with switches 621, 622, 623 and a current source set by resistor 619 which charges a timing capacitor $C_T$ 615.

The output stage 618 is configured to provide an output signal that is coupled to the input of a NOR gate 620 which provides a TIMER output that is coupled to the reset input of a D flip flop 630 which provides a Q output that remains high after triggering for a period Tregulated and a Q' output. The Q output and Q' output are used as shown to control the switches 621, 622 and 623 as well as to provide a Q' input to the NOR gate 620. This variable monostable multivibrator 600 has the advantage of not 'burning' any quiescent current during the skip operating phase.

As described above, to implement a tunable timer comprising a variable monostable multivibrator for controlling an energizing phase one can include a design where V of the TIMER is constant=VREF and I is regulated and equal to ICTRL=VCTRL/R(V-TO-I). A simple V-to-I converter can provide the V-TO-I conversion. When VCTRL rises, ICTRL rises as well according to Equation 1, which leads to a time reduction of the TIMER output. This would be the other version of the monostable multivibrator where pulse width is controlled via ICTRL.

Advantages of disclosed solutions include elimination of the need to sense the reversal of inductor current which is a known in the art to be a formidable challenge in high current, high frequency power converters, especially doing so for with very little quiescent current. As described above disclosed timing regulation circuits are first order systems. There is only pole comprising the common capacitor 140 and the addition of the current sources. This means that the disclosed regulation scheme is inherently stable, generally does not need any compensation, and can be made to operate quickly. The only limitation for its speed is the ripple voltage (of the VCTRL signal) that the tunable timer such as a variable monostable multivibrator can accept on its control input. In known schemes where the timings are predicted the design of the monostable multivibrator is often very complicated because it requires low quiescent current, speed and accuracy at the same time.

Figure 7:
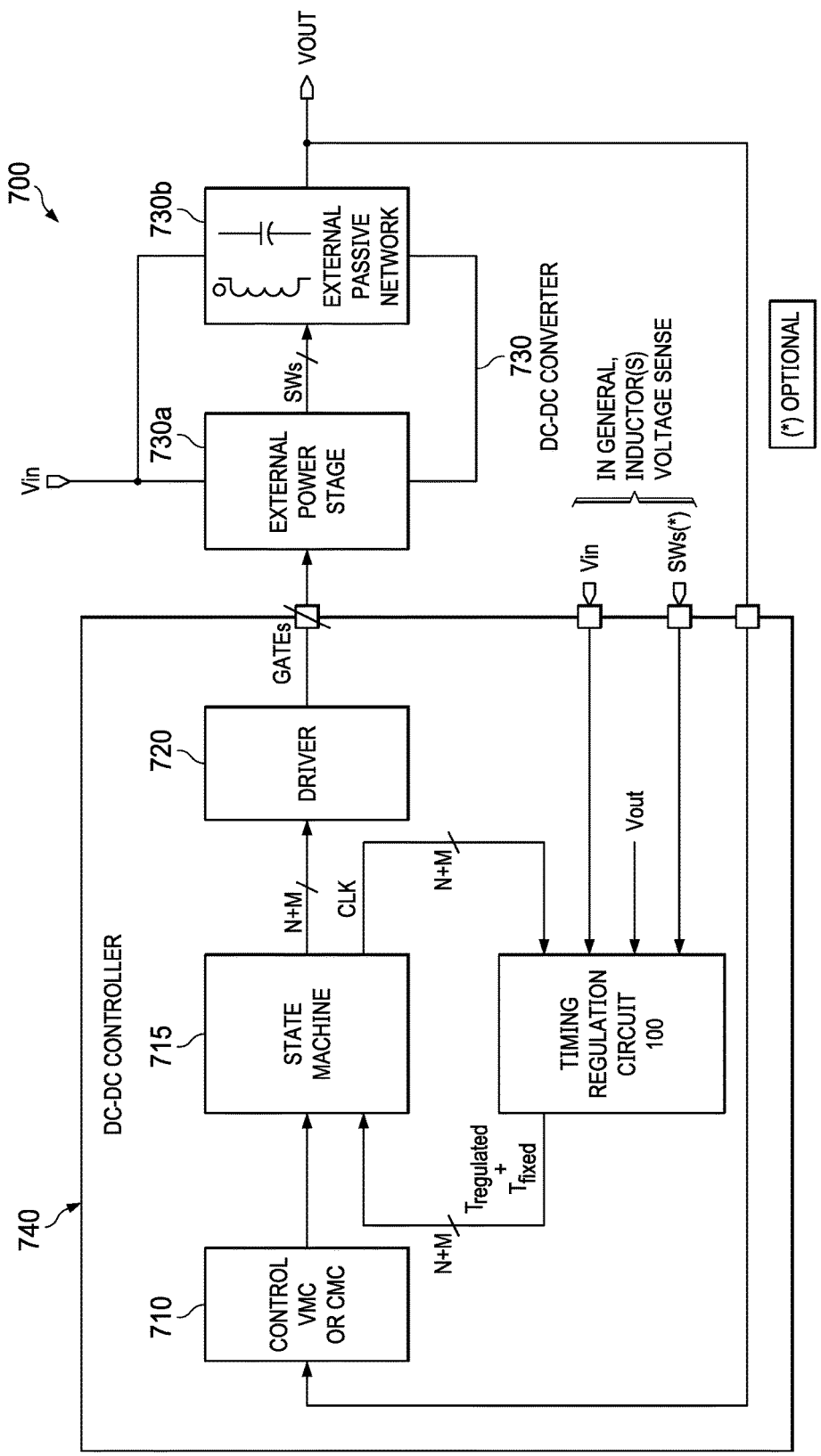
FIG. 7 shows an example switching regulator system including an example timing regulation circuit as a block of a DC-DC controller configured in a control loop with the DC-DC converter of the switching regulator system, according to this Disclosure.

As described above, disclosed timing regulation circuits can be used for power controllers, or together with a switch driver and a DC-DC converter to provide a switching regulator system. FIG. 7 shows an example switching regulator system 700 including a disclosed timing regulation circuit 100 as a block of the DC-DC controller 740 shown configured in a control loop with the DC-DC converter 730 of the switching regulator system 700. DC controller 740 is shown including a VMC or CMC block 710 coupled to the Vout node of the DC-DC converter 730 and to an input of a state machine 715. The DC-DC controller 740 also includes a driver block 720 that generates drive signals to the control node(s) of the power switch(es) of the power stage(s) 730a of the DC-DC converter 740.

The timing regulation circuit 100 is shown coupled to receive sensed (or estimated) parameters as shown including Vin, Vout, and optionally switches (SWs), and for its tunable timer (see tunable timer 155 in FIG. 1 described above) to output Tregulated, and for the fixed timers to output their Tfixed values to the state machine 715. The state machine 715 generates the clocks supplied to timers for timer triggering in the timing regulation circuit 100. The state machine 715 thus decides in which operating phase the DC-DC converter 730 is in, and therefore which power switch should be turned on/off. Therefore the same state machine 715 is coupled to the power stage 730a as well. In general, the PFM operation needs a sub/block that initiates the switching cycle allowing the system to leave the PAUSE state or state where no switching activity occurs.

The disclosed timing circuit 100 ends the mentioned switching cycle and forces the switching regulator system 700 into the PAUSE mode or other mode when no switching activity occurs. Usually, generally there is a comparator in the VMC or CMC block 710 that monitors Vout to initiate a switching cycle when Vout drops below its target for achieving a volt-second balance for the inductor of the external passive network 730b during duty cycles for at least one power phase of the DC-DC converter 730.

Those skilled in the art to which this Disclosure relates will appreciate that many other embodiments and variations of embodiments are possible within the scope of the claimed invention, and further additions, deletions, substitutions and modifications may be made to the described embodiments without departing from the scope of this Disclosure.

The invention claimed is:

1. A method of timing regulation for power converter control for use in a switching regulator including an inductor, comprising:

obtaining voltages across said inductor of at least one power stage of a DC-DC converter during a switching cycle including a plurality of operating converter phases comprising a first voltage $\Delta V_1$ during an energizing operating converter phase and a second voltage $\Delta V_2$ during a de-energizing operating converter phase;

generating a source current $I_1$ proportional to said $\Delta V_1$ and a sink current $I_2$ proportional to said $\Delta V_2$;

utilizing a timing regulation circuit that is coupled to receive said $I_1$ and said $I_2$, wherein said $I_1$ and said $I_2$ are coupled to a common capacitor by switches controlled by at least one fixed duration timer and a tunable timer that are each coupled to receive clock signals for triggering, said common capacitor providing a regulation voltage (VCTRL) coupled to a control node of said tunable timer, and in response, said tunable timer outputting a regulated duration (Tregulated) for a selected operating converter phase of said switching cycle selected from said plurality of operating converter phases, said at least one fixed duration timer outputting a fixed duration (Tfixed) for each of the other ones of the plurality of operating converter phases;

controlling a balancing switch coupled to said common capacitor based on Tregulated so that when said balancing switch is closed a predicted current (Ipredict) is provided that returns a current of said inductor to a starting value when all of said plurality of operating converter phases are finished based on providing a volt-second balanced condition around said inductor, and controlling operation of said DC-DC converter using said Tfixed and said Tregulated.

2. The method of claim 1, wherein said tunable timer comprises a monostable multivibrator.

3. The method of claim 1, wherein said at least one fixed duration timer provides Tfixed based on a given converter operating condition including at least a given input voltage, and a given output voltage for its said operating phase in order to achieve a predetermined switching frequency in pulse width modulation (PWM) mode.

4. The method of claim 1, wherein said tunable timer is regulated by said regulation voltage (VCTRL) so that said timing regulation circuit translates a volt-second balance principle equation in a voltage domain into said volt-second balance principle equation in a current domain.

5. The method of claim 1, wherein said clock signals are provided by a state machine.

6. The method of claim 1, wherein said power converter control comprises current mode control (CMC).

7. The method of claim 1, wherein said power converter control comprises voltage mode control (VMC).

8. The method of claim 1, wherein said DC-DC converter includes a plurality of said power stages.

9. The method of claim 1, wherein said DC-DC converter comprises a buck converter.

10. A timing regulation circuit for use in a switching regulator including an inductor, comprising:
at least one fixed duration timer and a tunable timer that are each for receiving clock signals for triggering;
a first current source for generating a source current $I_1$ proportional to a first voltage $\Delta V_1$ across said inductor of at least one power stage of a DC-DC converter during an energizing phase of a switching cycle of said DC-DC converter, and a second current source for generating a sink current $I_2$ proportional to a second voltage $\Delta V_2$ across said inductor during a de-energizing phase of said switching cycle;
wherein an output of said at least one fixed duration timer is coupled to control a first switch in series with said $I_1$ or said $I_2$ and an output of said tunable timer is coupled to control a balancing switch in series with an other of said $I_1$ or said $I_2$;
wherein said $I_1$ or said $I_2$ is coupled by said first switch and said other of said $I_1$ or said $I_2$ is coupled by said balancing switch to a common capacitor, wherein said common capacitor provides a regulation voltage (VCTRL) that is coupled to a control node of said tunable timer, and wherein said tunable timer outputs a regulated duration (Tregulated) for a selected operating phase of said switching cycle selected from said energizing phase and said de-energizing phase, and wherein said at least one fixed duration timer outputs a fixed duration (Tfixed) for an other operating phase of said switching cycle;
wherein when said Tregulated closes said balancing switch said common capacitor provides a predicted current (Ipredict) adapted for returning a current of said inductor to a starting value at an end of said switching cycle based on providing a volt-second balanced condition around said inductor.

11. The timing regulation circuit of claim 10, wherein said tunable timer comprises a monostable multivibrator.

12. The timing regulation circuit of claim 10, wherein said at least one fixed duration timer provides Tfixed based on a given converter operating condition including at least a given input voltage, and a given output voltage for its said operating phase in order to achieve a predetermined switching frequency in pulse width modulation (PWM) mode.

13. The timing regulation circuit of claim 10, wherein said tunable timer is regulated by said regulation voltage so that said timing regulation circuit translates a volt-second balance principle equation in a voltage domain into said volt-second balance principle equation in a current domain.

14. A DC-DC controller for controlling a DC-DC converter for use in a switching regulator including an inductor, comprising:
a state machine for generating clock signals;
a voltage mode control (VMC) or current mode control (CMC) block adapted for coupling to an output node of said DC-DC converter and to an input of said state machine;
a driver block having an input coupled to an output of said state machine for generating drive signals adapted to drive a control node of at least one power switch of at least one power stage of said DC-DC converter;
a timing regulation circuit coupled to receive at least an input voltage and an output voltage from said DC-DC converter, including:
at least one fixed duration timer and a tunable timer each for receiving one of said clock signals for triggering;
a first current source for generating a source current $I_1$ proportional to a first voltage $\Delta V_1$ across said inductor of said at least one power stage of said DC-DC converter during an energizing phase of a switching cycle of said DC-DC converter, and a second current source for generating a sink current $I_2$ proportional to a second voltage $\Delta V_2$ across said inductor during a de-energizing phase of said switching cycle;
wherein an output of said fixed duration timer is coupled to control a first switch in series with said $I_1$ or said $I_2$ and an output of said tunable timer is coupled to control a balancing switch in series with an other of said $I_1$ or said $I_2$;
wherein said $I_1$ or said $I_2$ is coupled by said first switch and said other of said $I_1$ or said $I_2$ is coupled by said balancing switch to a common capacitor, wherein said common capacitor provides a regulation voltage (VCTRL) that is coupled to a control node of said tunable timer, and wherein said tunable timer outputs a regulated duration (Tregulated) for a selected operating phase of said switching cycle selected from said energizing phase and said de-energizing phase, and wherein said at least one fixed duration timer outputs a fixed duration (Tfixed) for an other operating phase of said switching cycle;
wherein when said Tregulated closes said balancing switch said common capacitor provides a predicted current (Ipredict) adapted for returning a current of said inductor to a starting value at an end of said switching cycle based on a volt-second balanced condition around said inductor,
wherein said timing regulation circuit is coupled to provide said Tregulated and said Tfixed to said state machine.

15. The DC-DC controller of claim 14, wherein said tunable timer comprises a monostable multivibrator.

16. The DC-DC controller of claim 14, wherein said at least one fixed duration timer provides said Tfixed based on a given converter operating condition including at least a given input voltage, and a given output voltage for its said operating phase in order to achieve a predetermined switching frequency in pulse width modulation (PWM) mode.

17. The DC-DC controller of claim 14, wherein said tunable timer is regulated by said regulation voltage so that said timing regulation circuit translates a volt-second balance principle equation in a voltage domain into said volt-second balance principle equation in a current domain.

* * * * *